(12) United States Patent
Nguegang (10) Patent No.: US 11,607,066 B2
(45) Date of Patent: *Mar. 21, 2023

(54) TRAY ASSEMBLY

(71) Applicant: Bear Robotics, Inc., Redwood City, CA (US)

(72) Inventor: Gino Nguegang, San Mateo, CA (US)

(73) Assignee: Bear Robotics, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/206,494

(22) Filed: Mar. 19, 2021

(65) Prior Publication Data

US 2022/0296018 A1  Sep. 22, 2022

(51) Int. Cl.
*A47G 23/06* (2006.01)
*B25J 11/00* (2006.01)

(52) U.S. Cl.
CPC ....... *A47G 23/0633* (2013.01); *B25J 11/0045* (2013.01)

(58) Field of Classification Search
CPC .... A47G 23/0633; A47G 23/08; A47G 23/06; A47G 19/02; A47G 19/08; A47G 19/10; A47G 19/2255; A47G 19/2261; A47G 2019/2294; A47G 2400/08; B65D 1/34; B65D 21/0204; A47J 47/16

USPC ...... 220/574, 603, 625, 628, 629, 634, 4.27; 248/349.1, 346.04

See application file for complete search history.

(56) References Cited

U.S. PATENT DOCUMENTS

| | | | | |
|---|---|---|---|---|
| 9,521,919 | B1 * | 12/2016 | Reyes ................ | A47G 23/0225 |
| 2008/0099491 | A1 * | 5/2008 | Milne .................... | A47G 19/02 |
| | | | | 220/574 |
| 2011/0180547 | A1 * | 7/2011 | Park ........................ | A47J 47/16 |
| | | | | 220/574 |
| 2013/0215708 | A1 * | 8/2013 | Davis .................... | A47G 23/00 |
| | | | | 220/574 |

* cited by examiner

*Primary Examiner* — Robert Poon
(74) *Attorney, Agent, or Firm* — Dinsmore & Shohl LLP; Yongsok Choi, Esq.

(57) ABSTRACT

A tray assembly is provided. The tray assembly includes a first tray configured to be mounted to a robot; and a second tray provided above the first tray and configured to be rotatably coupled to the first tray. The second tray includes at least one first rolling member provided on a lower surface of the second tray, which faces the first tray, and an elastic member having at least one end which is fixedly connected to the lower surface. When the second tray is rotated relative to the first tray, the second tray is configured to be returned to its original position by virtue of a restoring force of the elastic member of the second tray.

19 Claims, 8 Drawing Sheets

FIG. 1

PRIOR ART

TRAY ASSEMBLY

FIELD OF THE INVENTION

The present disclosure relates to a tray assembly, more particularly, to a tray assembly which can be used in a robot for serving foods and/or beverages while being mounted to the robot.

BACKGROUND

As a robot technology advances, there are increasing interest in and demand for not only industrial robots but also service robots. The service robots have been applied in various fields of daily life. Among such service robots, an autonomous driving serving robot that carries foods ordered by a customer to a table of the customer in a restaurant or the like is known. The serving robot has the advantage of maximizing the operational efficiency of the restaurant and improving the quality of customer services, and thus is getting a lot of attention in recent years.

Figure 1:
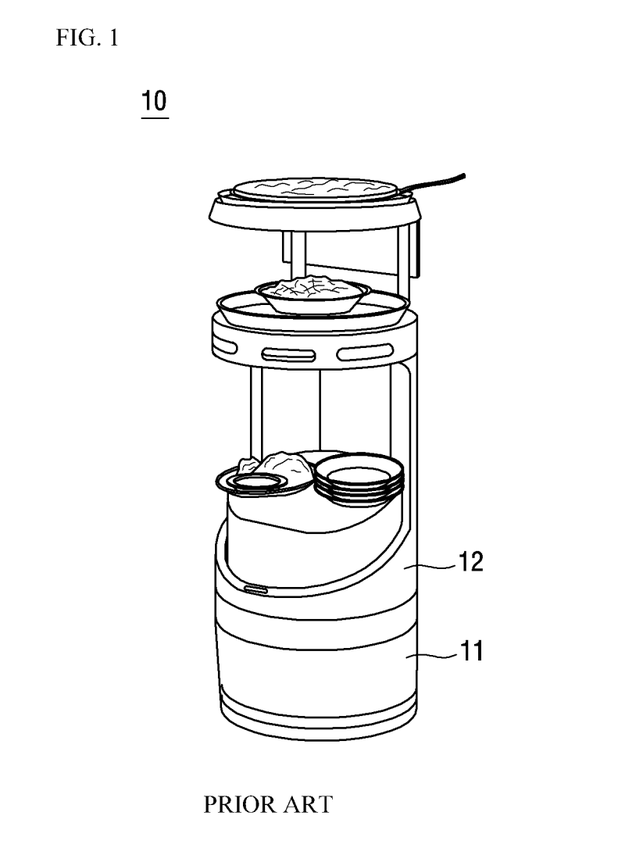
FIG. 1 exemplarily shows a robot for serving foods and/or beverages.

FIG. 1 exemplarily shows a robot for serving foods and/or beverages. Referring to FIG. 1, a robot 10 includes a drive part 11 for movement of the robot 10 and a main body 12 mounted on an upper end of the drive part 11. The main body 12 may be equipped with a device which enables a user to input commands or a device capable of receiving the user's commands through a wireless communication. Based on the commands inputted by the user, the robot autonomously travels to serve foods and/or beverages or move dishes after a meal. In addition, a tray may be placed on the upper surface of the main body 12 to serve the foods and/or beverages, or move the dishes.

During movement of the robot 10 or when the user picking up dishes and/or cups, impact may be applied to the tray placed on the upper surface of the main body 12 and vibration may be transmitted to the tray.

This situation may cause a problem that, if the tray is not stably mounted to the main body 12, the tray may be separated from the robot 10 and thus the foods and/or the beverages, or the dishes on the tray may drop down. In addition, even if the tray is stably mounted to the main body 12, the impact or vibration applied to the tray may be directly transmitted to the foods and/or the beverages, or the dishes, which may cause a problem that the foods and/or the beverages are spilled due to the vibration or the like.

Accordingly, with the development of the serving robot, a demand has existed for the development of a dedicated tray that can be stably mounted to the serving robot and can serve foods and/or beverages without any problems.

SUMMARY OF THE INVENTION

One object of the present disclosure is to provide a tray assembly which can be used in a robot for serving foods and/or beverages while being stably mounted to the robot.

Another object of the present disclosure is to provide a tray assembly which is capable of supporting serving for foods and/or beverages in a more stable manner by absorbing impact or vibration that may be transmitted to a tray with movement of a robot.

Yet another object of the present disclosure is to provide a tray assembly which can be easily separated from a robot for maintenance.

According to one embodiment of the present disclosure, there is provided a tray assembly, comprising: a first tray configured to be mounted to a robot; and a second tray provided above the first tray and configured to be rotatably coupled to the first tray. The second tray comprises at least one first rolling member provided on a lower surface of the second tray, which faces the first tray, and an elastic member having at least one end which is fixedly connected to the lower surface. When the second tray is rotated relative to the first tray, the second tray is configured to be returned to its original position by virtue of a restoring force of the elastic member of the second tray.

According to one embodiment of the present disclosure, the first tray may comprise an elastic member mounting portion formed on an upper surface of the first tray, which faces the second tray, to protrude toward the second tray. The elastic member of the second tray may be mounted to the elastic member mounting portion of the first tray, so that the restoring force is applied to the second tray when the second tray is rotated relative to the first tray.

According to one embodiment of the present disclosure, the elastic member of the second tray may comprise a plurality of tension springs, and the plurality of tension springs may be mounted to the elastic member mounting portion so as to enclose the elastic member mounting portion of the first tray.

According to one embodiment of the present disclosure, the second tray may further comprise an elastic member fixing pin formed on the lower surface of the second tray to protrude toward the first tray, and the at least one end of the elastic member may be fixedly connected to the elastic member fixed pin.

According to one embodiment of the present disclosure, a connecting hole may be formed at a position corresponding to the elastic member fixing pin of the second tray in the first tray, and the elastic member fixing pin may be configured to be inserted into the connecting hole of the first tray.

According to one embodiment of the present disclosure, at least one slot may be formed in a side of the first tray, and the second tray may comprise a coupling member provided at a position corresponding to the at least one slot of the first tray on a side surface of the second tray. The at least one slot of the first tray may be formed to be elongated along a circumferential direction of the first tray, and the coupling member of the second tray may be configured to be rotatable along the circumferential direction of the first tray when the coupling member is inserted into the at least one slot of the first tray.

According to one embodiment of the present disclosure, the at least one first rolling member may comprise a plurality of first rolling members provided along a circumferential direction of the second tray.

According to one embodiment of the present disclosure, the at least one first rolling member may be configured to be rollable in contact with an upper surface of the first tray which faces the second tray.

According to one embodiment of the present disclosure, the second tray may further comprise at least one damping member provided on the lower surface of the second tray.

The tray assembly according to one embodiment of the present disclosure may further comprise an intermediate plate provided between the first tray and the second tray. The intermediate plate may comprise at least one second rolling member provided on a lower surface of the intermediate plate, which faces the first tray.

According to one embodiment of the present disclosure, the intermediate plate may further comprise an elastic member mounting portion formed on an upper surface of the intermediate plate, which faces the second tray, to protrude toward the second tray. The elastic member of the second tray may be mounted to the elastic member mounting portion of the intermediate plate, and the restoring force may be applied to the second tray when the second tray is rotated relative to the first tray.

According to one embodiment of the present disclosure, the elastic member of the second tray may comprise a plurality of tension springs, and the plurality of tension springs may be mounted to the elastic member mounting portion of the intermediate plate so as to enclose the elastic member mounting portion.

According to one embodiment of the present disclosure, the second tray may comprise a latch provided on a side surface of the second tray, and a groove may be formed on a side surface of the first tray and may be configured to be engaged with the latch. The latch of the second tray may be configured to be rotatable along the circumferential direction of the first tray when the latch is engaged with the groove of the first tray.

According to one embodiment of the present disclosure, the at least one first rolling member may comprise a plurality of first rolling members provided along the circumferential direction of the second tray.

According to one embodiment of the present disclosure, the at least one first rolling member may be configured to be rollable in contact with the upper surface of the intermediate plate, which faces the second tray.

According to one embodiment of the present disclosure, the at least one second rolling member may be configured to be rollable in contact with the upper surface of the first tray, which faces the intermediate plate.

According to one embodiment of the present disclosure, the at least one second rolling member may be provided in a center of the lower surface of the intermediate plate.

According to one embodiment of the present disclosure, the intermediate plate may further comprise at least one cushioning member provided on the lower surface of the intermediate plate, which faces the first tray.

According to one embodiment of the present disclosure, the at least one cushioning member may be composed of at least one coil spring provided to face the first tray, and the at least one coil spring may comprise a plurality of coil springs provided along a circumferential direction of the intermediate plate.

According to one embodiment of the present disclosure, the intermediate plate may comprise a protruded portion formed to extend radially from a center of the lower surface of the intermediate plate, which faces the first tray. The first tray may comprise a recessed portion formed to correspond to a shape of the protruded portion, and the protruded portion of the intermediate plate may be seated onto the recessed portion of the first tray.

According to one embodiment of the present disclosure, by fixedly mounting a tray assembly to a robot, it is possible to implement a stable serving for foods and/or beverages.

Further, by allowing trays constituting a tray assembly to be rotatably coupled to each other and by compensating for impact or vibration which may be transmitted to the trays, it is possible to more stably implement serving for foods and/or beverages without spilling.

Further, by configuring trays constituting a tray assembly to be easily separated from each other, it is possible to facilitate maintenance.

DETAILED DESCRIPTION

Hereinafter, preferred embodiments of the present disclosure will be described in detail with reference to the appended drawings to such an extent that the present disclosure can be readily practiced by one of ordinary skill in the art.

Detailed descriptions of parts irrelevant to the present disclosure will be omitted for the purpose of more clearly describing the present disclosure. Throughout the specification, the same components will be described using like reference numerals. In addition, the sizes, thicknesses, positions, and the like of the respective components shown in the drawings are arbitrarily shown for the sake of convenience in description, and hence the present disclosure is not necessarily limited thereto. That is, it should be understood that specific shapes, configurations, and characteristics described in the specification may be modified in various embodiments without departing from the spirit and scope of the prevent disclosure, and positions or arrangements of individual components may be modified without departing from the spirit and scope of the prevent disclosure.

Therefore, detailed descriptions to be described below should be construed as non-limitative senses, and the scope of the prevent disclosure should be understood to include appended claims and their equivalents.

Figure 2:
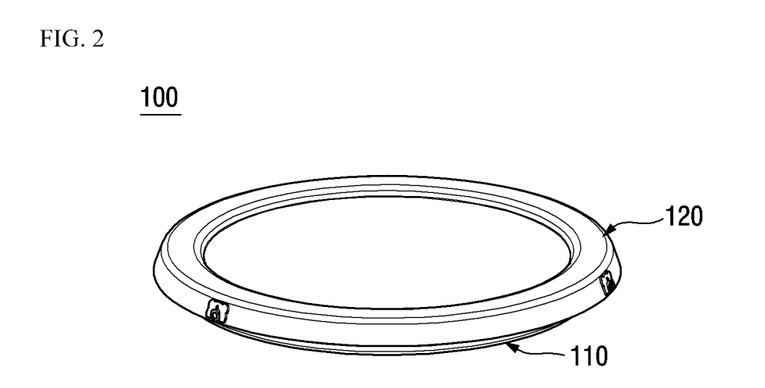
FIG. 2 shows a tray assembly according to a first embodiment of the present disclosure.
Figure 3:
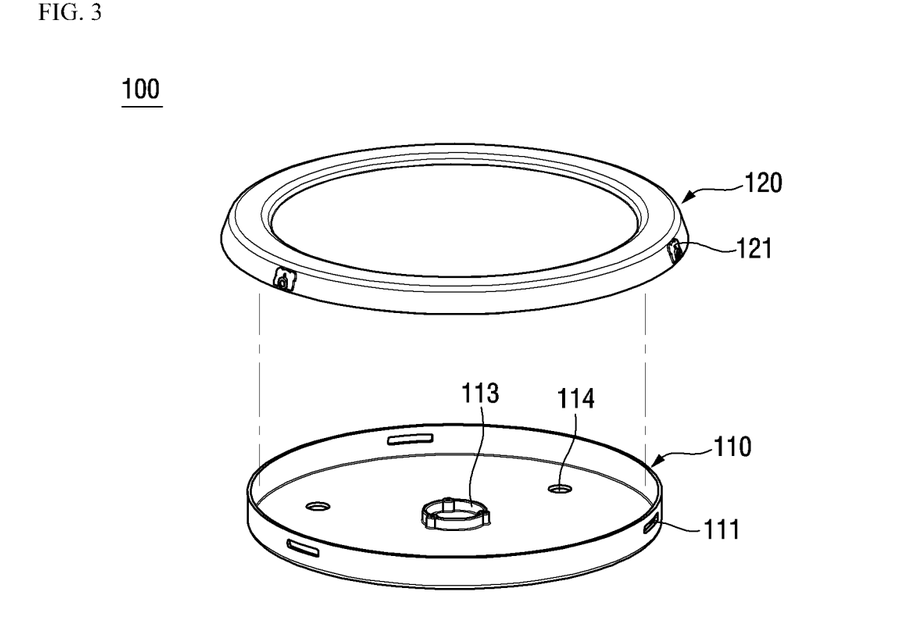
FIG. 3 is an exploded view of the tray assembly according to the first embodiment of the present disclosure, when obliquely viewed from above.
Figure 4:
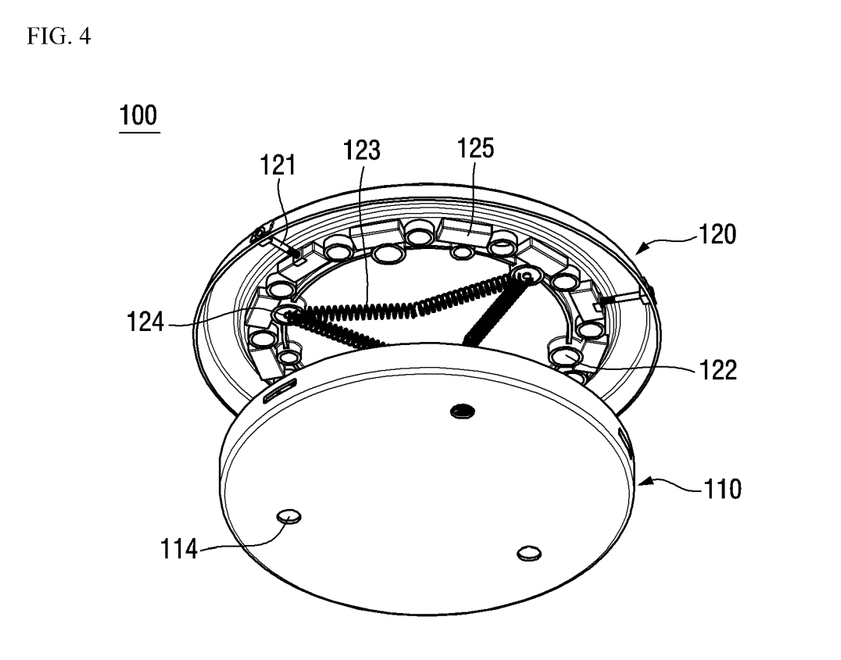
FIG. 4 is an exploded view of the tray assembly according to the first embodiment of the present disclosure, when obliquely viewed from below.

FIG. 2 shows a tray assembly according to a first embodiment of the present disclosure. FIG. 3 is an exploded view of the tray assembly according to the first embodiment of the present disclosure, when obliquely viewed from above. FIG. 4 is an exploded view of the tray assembly according to the first embodiment of the present disclosure, when obliquely viewed from below.

Referring to FIGS. 2 to 4, a tray assembly 100 according to the first embodiment of the present disclosure includes a first tray 110 and a second tray 120.

The first tray 110 of the tray assembly 100 according to the first embodiment is mounted to a robot to perform a function of fixing the tray assembly 100 to the robot. The first tray 110 may be configured to have a lower surface which faces the robot such that the first tray 110 can be fixedly mounted to the robot. The configuration of mounting the first tray 110 to the robot may be implemented using various known coupling methods such as a mechanical coupling manner, a magnetic force-based coupling manner, and the like. The description thereof will be omitted herein. Further, the first tray 110 can be detachably mounted to the robot for maintenance.

The second tray 120 of the tray assembly 100 according to the first embodiment performs a function of placing and holding dishes, cups, and the like thereon to service foods and/or beverages. To do this, the second tray 120 may be coupled to the first tray 110 from above. Specifically, at least one slots 111 may be formed in a side surface of the first tray 110, and coupling members 121 may be provided at positions corresponding to the at least one slots 111 of the first tray 110 on a side surface of the second tray 120. The coupling members 121 of the second tray 120 may be inserted into the respective slots 111 of the first tray 110 so that the second tray 120 is coupled to the first tray 110.

According to the first embodiment, the first tray 110 and the second tray 120 are configured to be rotatable while being coupled to each other.

Referring to FIG. 3, the slots 111 formed in the side surface of the first tray 110 may be formed to be elongated along a circumferential direction of the first tray 110. The coupling members 121 of the second tray 120 may be screws that can be inserted into the respective slots 111. Thus, the coupling members 121 are movable along the circumferential direction of the first tray 110 in a state in which the coupling members 121 are inserted into the respective slots 111. With this configuration, the second tray 120 can rotate relative to the first tray 110. Further, this configuration makes it possible to secure a stable coupling between the first tray 110 and the second tray 120 by preventing the second tray 120 from being separated from the first tray 110 when the tray assembly 100 is lifted up. In the first embodiment, three slots 111 formed along the circumferential direction of the first tray 110, and three coupling members 121 are provided on the second tray 120 to correspond to the three slots 111. The number of slots 111 and the number of coupling members 121 are not limited thereto but may be set to various numbers such as one, two, or four or more.

According to the first embodiment, the second tray 120 may include a first rolling member 122 provided on a lower surface of the second tray 120, which faces the first tray 110. Referring to FIG. 4, the first rolling member 122 may be configured to be rollable in contact with an upper surface of the first tray 110 facing the second tray 120 in the state in which the first tray 110 and the second tray 120 are coupled to each other. This makes it possible to ensure smooth rotation of the second tray 120 relative to the first tray 110.

In the first embodiment, as illustrated in the figures, the first rolling member 122 may include a ball housing and a ball provided to be rollable inside the ball housing, so that the ball is rollable in contact with the upper surface of the first tray 110 facing the second tray 120. However, the present disclosure is not limited thereto. For example, the first rolling member 122 may include the ball alone without the ball housing additionally provided, and a known rollable member such as a roller. Further, in the first embodiment, the first rolling member 122 of the second tray 120 may include six first rolling members 122 provided at regular intervals along the circumferential direction on the lower surface of the second tray 120. The number of first rolling members 122 may vary depending on the size, the rotation range, and the like of the tray assembly 100.

As described above, the first tray 110 and the second tray 120 may be rotatably coupled to each other. Further, the first tray 110 and the second tray 120 may be configured to be returned to their original positions by virtue of the restoring force after rotation, which will be described later.

Referring to FIG. 4, the second tray 120 of the tray assembly 100 according to the first embodiment may include an elastic member 123 and an elastic member fixing pin 124.

According to the first embodiment, the elastic member 123 of the second tray 120 performs a function of providing the restoring force of allowing the second tray 120 to be returned to its original position when the second tray 120 is rotated relative to the first tray 110. At least one end of the elastic member 123 of the second tray 120 may be fixedly connected to the lower surface of the second tray 120.

In the first embodiment, the elastic member 123 may be fixedly connected to the lower surface of the second tray 120 by the elastic member fixing pin 124 which is formed to protrude from the lower surface of the second tray 120 toward the upper surface of the first tray 110 facing the second tray 120. A connection hole 114 may be formed at a position corresponding to the elastic member fixing pin 124 of the second tray 120 in the first tray 110. When the first tray 110 and the second tray 120 are coupled to each other, the elastic member fixing pin 124 may be inserted into the connection hole 114. Accordingly, the elastic member fixing pin 124 can fixedly connect the elastic member 123 to the lower surface of the second tray 120, and can support the coupling of the first tray 110 and the second tray 120.

According to the first embodiment, the elastic member 123 of the second tray 120 may be composed of a plurality of springs. Specifically, the elastic member 123 may be composed of six tension springs. One end of each of the six tension springs is attached to the elastic member fixing pin 124, and the other end thereof is arranged toward the central portion of the second tray 120. The adjacent tension springs are connected to each other. Here, three elastic member fixing pins 124 are provided, and a set of two tension springs are mounted to one elastic member fixing pin 124. Accordingly, as illustrated in the figures, the six tension springs are configured to be connected to each another with a space interposed there between.

Referring back to FIG. 3, the first tray 110 may include an elastic member mounting portion 113 formed on the upper surface facing the second tray 120 to protrude toward the second tray 120. The elastic member mounting portion 113 of the first tray 110 is provided at the central portion of the upper surface of the first tray 110. When the first tray 110 and the second tray 120 are coupled to each other, the elastic member 123 of the second tray 120 may enclose the elastic member mounting portion 113 of the first tray 110. That is, the elastic member mounting portion 113 is positioned in the space formed by the six tension springs so that a central portion defined by connecting the six tension springs can be relatively fixed to the first tray 110.

This configuration enables the second tray 120 to return to its original position by virtue of the restoring force of the elastic member 123 even when the second tray 120 is rotated relative to the first tray 110. That is, even if impact or vibration is transmitted to the tray assembly 100 during the movement of the robot or the operation of the user, it is possible to reduce the impact or vibration to be transmitted to the foods and/or the beverages placed on the second tray 120 by allowing the second tray 120 to be returned to its original position after the rotation by the elastic member 123.

While in the first embodiment, the elastic member 123 is composed of the six tension springs, the elastic member may be embodied in other forms. For example, the elastic member may be embodied with a single torsion spring. In this case, both end portions of the single torsion spring may be connected to the elastic member mounting pin, and a central coil of the single torsion spring may be attached to the elastic member mounting portion. Further, the number, arrangement, elastic modulus, and the like of the elastic members 123 may vary depending on the load of foods and/or beverages that are carried by the tray assembly 100, the expected motion of the robot, and the like.

Further, in one embodiment, the second tray 120 may further include a damping member 125. The damping member 125 of the second tray 120 may be provided on the lower surface of the second tray 120, and serve to absorb and attenuate vibration caused by the rotation of the second tray 120 when the second tray 120 is rotated relative to the first tray 110 and when the second tray 120 is returned to its original position, and to stop the rotation.

The damping member 125 may be provided at such a position as not to hinder the rotation of the second tray 120, that is, a position as not to interfere with the first rolling member 122 and the elastic member 123 of the second tray 120. For example, as illustrated in the figures, a plurality of damping members 125 may be provided on the lower surface of the second tray 120 along the circumferential direction, and may be provided radially outward of the first rolling member 122. The number and weight of damping members 125 may vary depending on the load of foods and/or beverages that are carried by the tray assembly 100, the expected motion of the robot, and the like.

Figure 5:
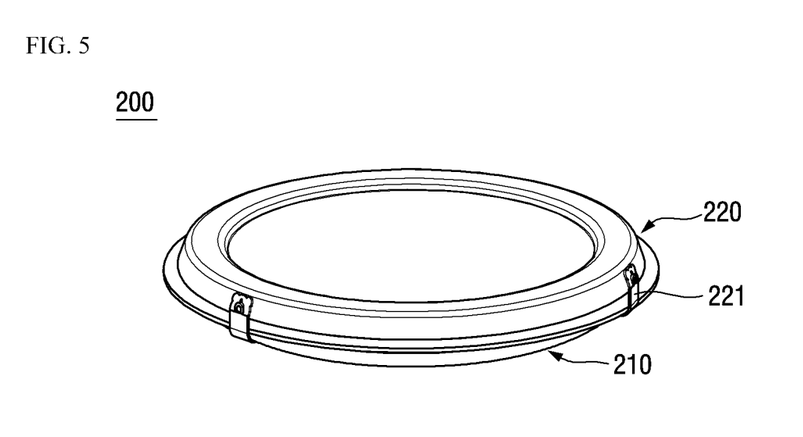
FIG. 5 shows a tray assembly according to a second embodiment of the present disclosure.
Figure 6:
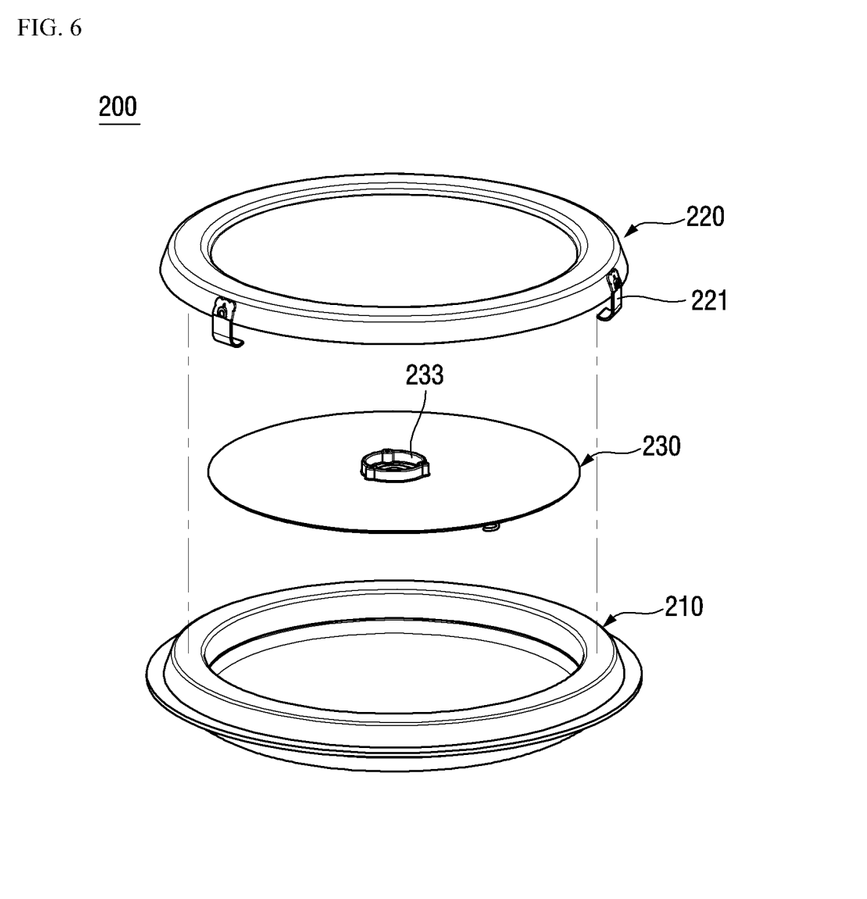
FIG. 6 is an exploded view of the tray assembly according to the second embodiment of the present disclosure, when obliquely viewed from above.
Figure 7:
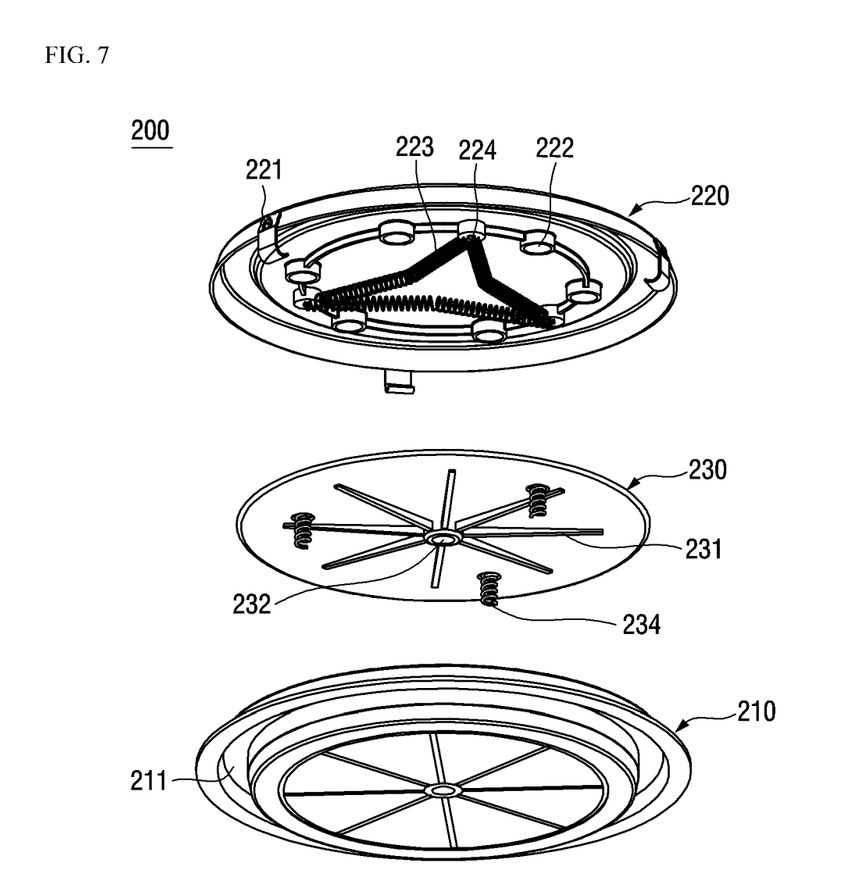
FIG. 7 is an exploded view of the tray assembly according to the second embodiment of the present disclosure, when obliquely viewed from below.

FIG. 5 shows a tray assembly according to a second embodiment of the present disclosure. FIG. 6 is an exploded view of the tray assembly according to the second embodiment of the present disclosure, when obliquely viewed from above. FIG. 7 is an exploded view of the tray assembly according to the second embodiment of the present disclosure, when obliquely viewed from below.

Referring to FIGS. 5 to 7, a tray assembly 200 according to the second embodiment of the present disclosure includes a first tray 210 and a second tray 220, similar to the tray assembly 100 according to the first embodiment. Further, the tray assembly 200 according to the second embodiment further includes an intermediate plate 230 positioned between the first tray 210 and the second tray 220.

The first tray 210 of the tray assembly 200 according to the second embodiment may be mounted to the robot, and the second tray 220 may be rotatably coupled to the first tray 210 from the top of the first tray 210. According to the second embodiment, a latch 221 may be provided on a side surface of the second tray 220, and a groove 211 may be formed on a side surface of the first tray 210 along an outer periphery of the first tray 210. The latch 221 of the second tray 220 may be engaged with the groove 211 of the first tray 210. The second tray 220 may be rotated relative to the first tray 210 while the latch 221 moves along the groove 211.

Like the second tray 120 of the tray assembly 100 according to the first embodiment of the present disclosure, the second tray 220 of the tray assembly 200 according to the second embodiment of the present disclosure may include a first rolling member 222, an elastic member 223, and an elastic member fixing pin 224. Further, although not illustrated in the figures, the second tray 220 may further include a damping member. The configurations and functions of the first rolling member 222, the elastic member 223, the elastic member fixing pin 224, and the damping member of the second embodiment are substantially the same as those in the first embodiment, and thus a detailed description thereof will be omitted. The following description will be primarily focused on differences between the first embodiment and the second embodiment.

According to the second embodiment, then intermediate plate 230 is provided between the first tray 210 and the second tray 220. Accordingly, the first rolling member 222 of the second tray 220 is configured to be rollable in contact with an upper surface of the intermediate plate 230 facing the second tray 220.

Referring to FIGS. 6 and 7, the intermediate plate 230 of the tray assembly 200 according to the second embodiment may include a protruded portion 231, a second rolling member 232, an elastic member mounting portion 233, and a cushioning member 234.

The elastic member mounting portion 233 of the intermediate plate 230 according to the second embodiment is similar in configuration and function to the elastic member mounting portion 113 of the first tray 110 according to the first embodiment. That is, the elastic member mounting portion 233 of the intermediate plate 230 may be formed to protrude toward the second tray 220 from the center of the upper surface of the intermediate plate 230 facing the second tray 220. Thus, when the first tray 210, the second tray 220, and the intermediate plate 230 are coupled to each another, the elastic member 223 of the second tray 220, namely the central portion of the six tension springs, may be mounted to enclose the elastic member mounting portion 233. In this manner, the elastic member 223 of the second tray 220 may be relatively fixed to the intermediate plate 230 by the elastic member mounting portion 233. Thus, even if the second tray 220 is rotated relative to the first tray 210 and the intermediate plate 230, the second tray 220 can be returned to its original position by virtue of the restoring force of the elastic member 223.

According to the second embodiment, the second rolling member 232 of the intermediate plate 230 may be provided on a lower surface of the intermediate plate 230 facing the first tray 210, and may be configured to be rollable in contact with an upper surface of the first tray 210 facing the intermediate plate 230. The second rolling member 232 is provided at the center of the lower surface of the intermediate plate 230 to perform a function of keeping balance and supporting smooth operation when the second tray 220 is rotated relative to the first tray 210.

According to the second embodiment, the cushioning member 234 of the intermediate plate 230 may be provided on the lower surface of the intermediate plate 230 facing the first tray 210, and may perform a function of supporting the intermediate plate 230 on the first tray 210 and absorbing impact generated in an up-down direction. The cushioning member 234 may be composed of a coil spring extending toward the first tray 210. Further, a plurality of cushioning members may be provided at regular intervals along the circumferential direction of the intermediate plate 230. Of course, the size, number, elastic modulus, and the like of the cushioning members 234 may vary depending on the size of the tray assembly 200, the load of foods and/or beverages that are carried by the tray assembly 200, the expected motion of the robot, and the like.

According to the second embodiment, the protruded portion 231 of the intermediate plate 230 may be formed to extend radially from the center of the bottom surface of the intermediate plate 230. The first tray 210 may have a recessed portion formed to correspond to the shape of the protruded portion 231. In this case, the protruded portion 231 of the intermediate plate 230 is seated onto the recessed portion of the first tray 210, so that the intermediate plate 230 can be coupled to the first tray 210 in a stable manner.

Although the upper surfaces of the second trays 120 and 220 have been described as being flat in the above-described embodiments, they may have other forms.

Figure 8:
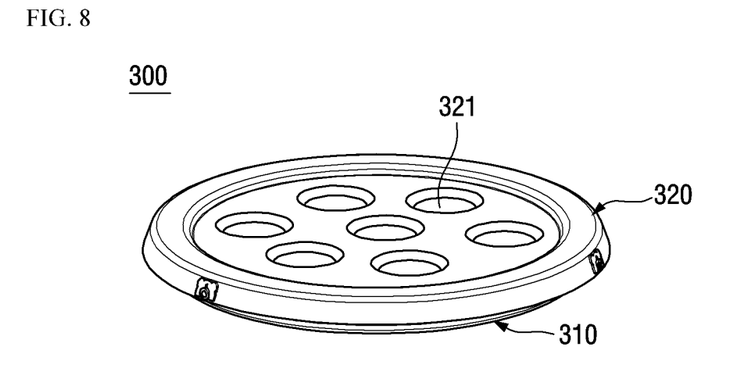
FIG. 8 shows a tray assembly according to a third embodiment of the present disclosure.

FIG. 8 shows a tray assembly according to a third embodiment of the present disclosure. Referring to FIG. 8, a tray assembly 300 according to the third embodiment of the present disclosure includes a first tray 310 and a second tray 320 as in the above-described embodiments. The tray assembly 300 according to the third embodiment differs from the above-described embodiments in that a plurality of grooves 321 are formed in an upper surface of the second tray 320.

Specifically, the plurality of grooves 321 in each of which the bottom of a cup and/or bottle is received at the time of serving, may be formed at regular intervals in the upper surface of the second tray 320 according to the third embodiment. Each of the plurality of grooves performs a function of stably fixing the cup and/or the bottle. The shape and size of each groove may vary in consideration of the shape and size of the cup and/or bottle to be used for serving.

As described above, in the third embodiment, the plurality of grooves are formed in the upper surface of the second tray. Thus, by stably fixing the cup or bottle to the tray assembly at the time of serving, for example, the beverage, it is possible to prevent the beverage from spilling at the time of serving. In addition, it is possible to serve multiple beverages at a time, thus enhancing user convenience.

While the present disclosure has been described above by way of particular features such as specific components and the like, and exemplary embodiments, these embodiments are provided to further facilitate overall understanding of the present disclosure, and the present disclosure is not limited thereto. Various modifications and variations may be made from the above descriptions by those skilled in the art.

Therefore, the spirit of the present disclosure should not be limited to the above-described embodiments, and not only the append claims but also all those modified equally or equivalently to the claims are intended to fall within the scope of the spirit of the present disclosure.

What is claimed is:

1. A tray assembly, comprising:
a first tray configured to be mounted to a robot; and
a second tray provided above the first tray and configured to be rotatably coupled to the first tray,
wherein the second tray comprises at least one first rolling member provided on a lower surface of the second tray, which faces the first tray, and an elastic member having at least one end which is fixedly connected to the lower surface,
wherein the at least one first rolling member is configured to roll in contact with an upper surface of the first tray, which faces the second tray, and
wherein when the second tray is rotated relative to the first tray, the second tray is configured to be returned to its original position by virtue of a restoring force of the elastic member of the second tray.

2. The tray assembly of claim 1, wherein the first tray comprises an elastic member mounting portion formed on an upper surface of the first tray, which faces the second tray, to protrude toward the second tray, and
wherein the elastic member of the second tray is mounted to the elastic member mounting portion of the first tray, so that the restoring force is applied to the second tray when the second tray is rotated relative to the first tray.

3. The tray assembly of claim 2, wherein the elastic member of the second tray comprises a plurality of tension springs, and the plurality of tension springs are mounted to the elastic member mounting portion so as to enclose the elastic member mounting portion of the first tray.

4. The tray assembly of claim 1, wherein the second tray further comprises an elastic member fixing pin formed on the lower surface of the second tray to protrude toward the first tray, and
wherein the at least one end of the elastic member is fixedly connected to the elastic member fixed pin.

5. The tray assembly of claim 4, wherein a connecting hole is formed at a position corresponding to the elastic member fixing pin of the second tray in the first tray, and the elastic member fixing pin is configured to be inserted into the connecting hole of the first tray.

6. The tray assembly of claim 1, wherein at least one slot is formed in a side of the first tray,
wherein the second tray comprises a coupling member provided at a position corresponding to the at least one slot of the first tray on a side surface of the second tray, and
wherein the at least one slot of the first tray is formed to be elongated along a circumferential direction of the first tray, and the coupling member of the second tray is configured to be rotatable along the circumferential direction of the first tray when the coupling member is inserted into the at least one slot of the first tray.

7. The tray assembly of claim 1, wherein the at least one first rolling member comprises a plurality of first rolling members provided along a circumferential direction of the second tray.

8. The tray assembly of claim 1, wherein the second tray further comprises at least one damping member provided on the lower surface of the second tray.

9. The tray assembly of claim 1, further comprising an intermediate plate provided between the first tray and the second tray,
wherein the intermediate plate comprises at least one second rolling member provided on a lower surface of the intermediate plate, which faces the first tray.

10. The tray assembly of claim 9, wherein the intermediate plate further comprises an elastic member mounting portion formed on an upper surface of the intermediate plate, which faces the second tray, to protrude toward the second tray,
wherein the elastic member of the second tray is mounted to the elastic member mounting portion of the intermediate plate, and the restoring force is applied to the second tray when the second tray is rotated relative to the first tray.

11. The tray assembly of claim 10, wherein the elastic member of the second tray comprises a plurality of tension springs, and the plurality of tension springs are mounted to the elastic member mounting portion of the intermediate plate so as to enclose the elastic member mounting portion.

12. The tray assembly of claim 9, wherein the second tray comprises a latch provided on a side surface of the second tray, and a groove is formed on a side surface of the first tray and configured to be engaged with the latch, and
wherein the latch of the second tray is configured to be rotatable along a circumferential direction of the first tray when the latch is engaged with the groove of the first tray.

13. The tray assembly of claim 9, wherein the at least one first rolling member comprises a plurality of first rolling members provided along a circumferential direction of the second tray.

14. The tray assembly of claim 9, wherein the at least one first rolling member is configured to be rollable in contact with an upper surface of the intermediate plate, which faces the second tray.

15. The tray assembly of claim 9, wherein the at least one second rolling member is configured to be rollable in contact with an upper surface of the first tray, which faces the intermediate plate.

16. The tray assembly of claim 9, wherein the at least one second rolling member is provided in a center of the lower surface of the intermediate plate.

17. The tray assembly of claim 9, wherein the intermediate plate further comprises at least one cushioning member provided on the lower surface of the intermediate plate, which faces the first tray.

18. The tray assembly of claim 17, wherein the at least one cushioning member is composed of at least one spring provided to face the first tray, and
    wherein the at least one spring comprises a plurality of coil springs provided along a circumferential direction of the intermediate plate.

19. The tray assembly of claim 9, wherein the intermediate plate comprises a protruded portion formed to extend radially from a center of the lower surface of the intermediate plate, which faces the first tray, and
    wherein the first tray comprises a recessed portion formed to correspond to a shape of the protruded portion, and the protruded portion of the intermediate plate is seated onto the recessed portion of the first tray.

\* \* \* \* \*